United States Patent [19]

Parker

[11] Patent Number: 5,039,011
[45] Date of Patent: Aug. 13, 1991

[54] UNDERGROUND CONNECTORS FOR SPRINKLER SYSTEMS

[76] Inventor: Frank M. Parker, 19889 Forest Ave., Castro Valley, Calif. 94546

[21] Appl. No.: 368,641

[22] Filed: Jun. 20, 1989

[51] Int. Cl.$^5$ ............................................. B05B 15/08
[52] U.S. Cl. ........................................ 239/1; 239/205; 239/588; 239/201; 138/121
[58] Field of Search ............... 239/588, 269, 200, 201, 239/206, 542, 547, 203, 204, 1, 205; 138/118, 121, 122, 131, 139; 285/156, 423

[56] References Cited

U.S. PATENT DOCUMENTS

| | | | |
|---|---|---|---|
| 2,706,134 | 4/1955 | Wilson et al. | 239/269 X |
| 2,759,765 | 8/1956 | Pawley | 138/131 X |
| 3,292,378 | 12/1966 | Rosenthal et al. | 239/547 X |
| 3,313,319 | 4/1967 | Osborn et al. | 138/121 |
| 3,480,299 | 11/1969 | Henderson | 285/4 |
| 3,597,517 | 8/1971 | Smith | 264/97 |
| 3,858,615 | 1/1975 | Weigl | 138/121 |
| 3,993,060 | 11/1976 | Mitchell | 138/121 X |
| 4,010,898 | 3/1977 | Williams | 239/547 X |
| 4,033,614 | 7/1977 | Hanson | 285/248 |
| 4,165,110 | 8/1979 | Itzler | 285/226 |
| 4,179,142 | 12/1979 | Schopp | 285/239 |
| 4,420,019 | 12/1983 | Dillon | 138/122 X |
| 4,453,749 | 6/1984 | McKinnon | 285/4 |
| 4,456,034 | 6/1984 | Bixby | 138/131 X |
| 4,669,508 | 6/1987 | Neaves | 138/DIG. 8 |
| 4,765,541 | 8/1988 | Mangels et al. | 239/201 |

OTHER PUBLICATIONS

Plate, Norman A., "When Old Faithful Appears In Your Front Lawn", Sunset Magazine, 1986.
Lawn Genie, "Install Your Own Sprinkler System In 3 Easy Steps", Oct. 1987, pp. 4–7, 10, and 13–14.
Wolfarth, Ron, "The Nuts And Bolts Of Irrigation Design", Landscape Design, vol. 2, No. 2, Mar./Apr. 1989, pp. 29–36.

Primary Examiner—Andres Kashnikow
Assistant Examiner—Kevin Weldon
Attorney, Agent, or Firm—Julian Caplan

[57] ABSTRACT

An underground branch connector assembly for water feed from a main supply pipe to a sprinkler head which permits a range of locations of the sprinkler head independent of the location of the supply pipe, comprising a flexible hose having an anti-kinking feature and special terminal fittings (preferably both male) for connection at one end to a sprinkler head and at the other end to the water supply pipe. The anti-kink feature comprises either an external corrugated sheath or internal reinforcing, such as fiberglass roving, or a steel or plastic coil embedded in the hose wall. The hose is preferably of predetermined length, selected to be somewhat longer than the reach required from the main supply pipe to the desired sprinkler head location. The preferred assembly also includes a plate adjacent the sprinkler head end that permits stable emplacement of the sprinkler head. The flexible non-kink hose of excess length allows imprecise trenching yet precise head location in a proper watering array. The preassembled underground branch connector assembly reduces installation time and errors, and breakage of lines in service.

31 Claims, 3 Drawing Sheets

UNDERGROUND CONNECTORS FOR SPRINKLER SYSTEMS

FIELD

This invention relates to sprinkler systems such as are used to water lawns, gardens, orchards, or the like, and particularly to branch connectors for connecting the sprinkler head to the water supply pipe, or for bypassing underground obstructions for main or lateral feed lines.

BACKGROUND

A conventional system for landscape watering comprises sprinkler heads that are arranged in an array over the area to be watered wherein each head is connected to a network of underground pipes that supply the water. Present practice is to use conventional plumbing hardware, such as: rigid or semi-rigid angles, Tees, ells, rigid nipples, unions and the like in order to connect the sprinkler to the water pipes. However, this construction is subject to numerous problems and inconveniences. For example, laying out and accurately cutting pipe nipples and arranging Tees, angles, etc., is very tedious and expensive in terms of labor costs and hardware.

An example of the disadvantages of present practice is the high degree of skill and the high cost of labor that is required to properly dig trenches, not only for the lateral supply pipe downstream of the valve assembly, but also for the branches of pipe leading from the lateral supply pipe out to each sprinkler head. In general, it is necessary to dig straight or extra wide trenches because the rigid pipe is straight. However, this becomes virtually impossible because of rocks, tree roots, foundations, buried cables or other objects. Where such obstacles are encountered, the trench must be dug, typically by hand, around and at a safe and appropriate distance from the object. Then pipe must be cut to fit, and elbows, angles, Tees, nipples, unions and the like must be glued or threaded in place. If the pipe is displaced or twisted, the entire watering pattern is in disarray with patches of over- and under-watering.

Great care must be taken when trenching in order to avoid striking underground obstacles such as main water service lines, electrical service lines, gas service lines, etc, as trenching requirements reach 16", 24", or more. Deep trenches require a greater amount of labor and equipment. Open, deep trenches are a safety hazard on any jobsite. Further, trenches must be cleaned out repeatedly by hand, due to foot traffic in the work area, inadvertently knocking dirt, rocks, and debris into the trenches. Also, to prevent costly damage by or to trenching tools and equipment, trenches must be dug at a reasonably safe and appropriate distance away from such obstacles as sidewalks, curbs, driveways, planting borders, and the like. Since most sprinkler heads are located within a few inches from sidewalks, curbs, driveways, etc., the remaining trenching to these locations is almost always done by hand. Trenching is not only the most hazardous and time consuming part of installing an underground sprinkler system, but also requires a great deal of care and skilled labor.

A particularly serious problem is that during assembly of conventional sprinkler systems, the feed-pipe (lateral line) is constantly being moved around in the trench because various Tees, nipples and sprinkler heads are being attached to it along its length. As each section of pipe is cut to length to fit various unions, Tees, etc., the pipe is lifted out of the trench and the next piece is attached, typically by eye, and is easily subject to misalignment. The feed-pipe is cut, and elbows, angles, tees, nipples, unions, and the like must be glued or threaded into place, and then the sprinkler head is attached. The time to measure, calculate, cut, assemble, and fasten becomes extensive. This process repeats itself when the next sprinkler head is to be attached; however, while handling the feed-pipe for the next sprinkler head assembly, the sprinkler head (or heads) previously assembled and set into place, will unavoidably be disturbed.

The pipe has some lateral flex, typically snaking along even the straightest of trenches resulting in misalignment of the heads. But the sprinkler head placement needs to be in a predetermined, relatively regular array to give proper coverage without overlap or gaps in coverage. Thus, when the fixed-length lateral nipples and elbows are attached to the feed pipe, followed by vertical nipples, transitions and sprinkler heads, the final sprinkler head array is usually misaligned to some degree, often significantly so.

Another problem which adds to the misalignment of the sprinkler heads occurs when the trenches are back-filled. After all underground piping is completed, the trenches are backfilled with soil, and packed firmly. Care must be taken not to disturb the piping which can easily shift its position in the trench when soil is back-filled. Since the feed-pipe, Tees, Ells, nipples and sprinkler heads have all been glued and fitted together, and since the sprinkler heads have been positioned in place, there can be no shifting of pipe allowed while backfilling. Even the most carefully assembled sprinkler system will have severe alignment and or poor coverage if the backfilling is carelessly done, and the piping and sprinkler heads are cause to shift out of position. This can also cause tortional cracking of rigid pipes, or even cause shear-off of entire sections or individual sprinkler heads.

Equally significantly, the feed pipe Tees are typically, indeed almost always, angularly improperly aligned. That is, viewing the feed pipe in cross-section at the bottom of the trench and taking the longitudinal axis of the pipe as the center of the pipe, the side arm of the Tee to feed a given sprinkler head must be relatively precisely angularly positioned for a given job, be it at 0° (upward vertical feed), 30°, 45°, 90° (right side feed, viewed clockwise), 270° (left side feed), or some angular amount ± the 90° or 270°60 position. If the Tee is not angularly properly positioned, then the nipple, elbow and sprinkler head will be cocked at an angle, as well as buried or elevated aboveground. While current nipples and transitions come in joined segmented units, the units are exactly that; they have preset unit length that does not permit accurate intermediate placement.

Thus, the pipe not only snakes sideways in the trench, but also up and down as rocks or clumps of earth are used to prop it up to compensate for poor tee/nipple/elbow/head assembly. More seriously, the pipe is rotationally twisted (placed under torsional stress) for proper vertical and angular placement of the sprinkler heads. The next adjacent heads along a single feed pipe are often torsionally stressed in opposite, rotationally angular directions. While the pipe can stand some lateral bending, it is less able to handle torsional (rotational or twisting) stresses, thus leading to failure in service. This failure is aggravated by settling of the pipe as the trench fill compacts over time, or the pipe is driven-over by vehicles (cars, lawn tractors, etc). While use of thin wall (Schedule 20), instead of heavy duty (Schedule 40) pipe provides some flexibility, it is even less able to handle such torsional or loading stresses, and is easily punctured by rocks, spades, etc.

The entire problem is aggravated where the layout requires the feed pipe (manifold) to turn corners. This is the case in almost 100% of the cases. An angularly improperly oriented 90°60 elbow thus affects at least one entire branch of the line.

Further, sprinkler arrays must be laid out in 3-dimensions. That is, the land is rarely flat, yet sprinkler heads must all be positioned properly with respect to ground level which varies throughout the field being sprinklered. The rigid/semi-rigid, pipe/elbow/nipple/head systems offered today simply do not permit proper placement without very careful prior layout and skilled assembly of parts. Even so, the unit-length problem does not permit proper final adjustment.

All these problems are made more severe by the use of unskilled labor. It takes brains and experience to lay out and install a sprinkler system correctly. It looks simple, but it is hard and precision work. But landscape services hire laborers at minimum wage for digging the trenches. Being unskilled, not appreciating the problems, and often being relegated to such work because none too bright, the workers often do not do good or even adequate jobs in trenching, cutting pipe to length, and figuring out proper angular and lateral placement. They thus misalign, both laterally and angularly, the various lateral and main feed-pipes, Tees, nipples, Ells, heads, etc. The resulting job is poor, with overwatering and dry spots all in the same lawn, garden, etc. The workers leave an unhappy client, typically a homeowner, who does not want to pay. The sprinkler system installer looses jobs, the workmen drift on the other lines of work, and more inexperienced contractors spring up to leave another generation of shoddy jobs behind. Systems fail, leaks develop, and water, a particularly precious commodity in the West, is wasted.

Yet another problem is encountered when long "pop-up" sprinkler heads are to be installed. They are used to clear shrubs or tall plantings, rocks, walls etc. The body of many "pop-up" sprinklers require a hole that is eighteen inches or more deep. Thus, where these "pop-up" sprinklers are required, rather than setting the supply pipe at the usual 6–12" depth, the landscape contractor must install the entire lateral feed-pipe(s) array at a depth of eighteen or more inches. That is no less than 3 times the digging, and the angular misalignment problems are made even more severe, as fractional angular errors are multiplied over the greater length of the heads, nipples, etc.

Other problems include: frequent breakage of the sprinkler head when the head is inadvertently kicked; growing grass interferes with the flow of water from the head; the height of the head above the ground is not accurately set and maintained. Many of these problems are discussed in Sunset Magazine, June 1986, published by the Lane Publishing Company.

The prior art does not either recognize or solve these problems. Indeed the prior art found has focused on the prevention of damage due to inadvertently striking the sprinkler head. The prior art has generally ignored the problem of excessive labor and cost associated with rigid structures of preset unit length.

For example, U.S. Pat. No. 3,759,445, discloses a short, only semi-flexible connection positioned below ground level to the sprinkler head from a water pipe so that if the sprinkler head is accidentally struck, the connection will yield without breaking. Because of its intended purpose, this semi-flexible connector is only a few inches long, and will collapse or kink when the bend is severe. Furthermore, the positioning of the sprinkler head is unstable relative to the surface of the ground.

The semi-flexible connection disclosed in U.S. Pat. No. 2,582,249, provides resistance to kinking but is only slightly flexible, so that placement of the sprinkler relative to the water pipe is severely limited.

The corrugated constructions of U.S. Pat. Nos. 2,582,250 and 4,314,718 and 4,314,717 are only semi-flexible and do not provide strength against puncture by spades or high water pressure. It also does not prevent what is required in many situations: collapsing or kinking due to bending or an inadvertent blow from a passing machine or pedestrian.

U.S. Pat. No. 3,904,120, discloses a sprinkler head recessed into a heavy disk that is set into the ground and provides an anchor for the sprinkler head. However this device does not address the problem of requiring accurate dimensioning of nipples and fittings regarding the placement of the sprinkler relative to the water pipe. Furthermore, the sprinkler head is incorporated integrally into the disk so that choice of sprinkler head is restricted.

U.S. Pat. No. 4,669,508, discloses a heavy, permanently curved hose for automobile cooling systems and therefore does not provide the flexibility required for the purposes of this invention.

U.S. Pat. No. 4,256,262 discloses a light duty connector between a water supply pipe lying above ground and a sprinkler head that is supported several feet above ground on a special spiked stand.

Other patents such as U.S. Pat. Nos. 4,256,262; 2,752,195; 4,382,556; and 4,095,744 are designed for above-ground construction. A number of couplings, disclosed in U.S. Pat. Nos. 4,165,109; 3,843,169; 3,614,137; 3,224,794; are designed for purposes other than those of the present invention. There are also references U.S. Pat. Nos. 4,179,171; 4,033,614; 3,346,274; 3,363,319: 2,807,478: that pertain to rigid coupling means that do not address the problems that are resolved by this invention.

It is apparent, therefore, that none of these patents address the problem of reducing the cost and labor associated with the current procedures used to install sprinkler systems.

THE INVENTION

OBJECTS

It is an object of this invention to provide special flexible but non-kinking branch connector assemblies for use between a sprinkler head and its water supply pipe so that the sprinkler head can be placed at locations that are relatively independent of the water pipe positions without requiring accurate trenching, placement of the pipe, angular positioning of the Tees, or dimensioning of pipe nipples and connectors as required by the prior art.

It is another object of this invention to provide a branch connector to sprinkler heads which is resistant to damage such as may result from an inadvertent blow to the sprinkler head from a passing machine or pedestrian, or from pressing by stones or shovels, etc.

It is another object of this invention to provide a sprinkler irrigation system in which the branch connector between the sprinkler head and water pipe, or between segments of a main or lateral line, is resistant to kinking and collapse and can withstand high water pressures.

It is another objective of this invention to provide a means of locating the sprinkler head in a fixed position relative to the ground surface.

It is another object of this invention to provide a sprinkler system in which the sprinkler heads can be precisely located without need for precision in layout, trenching, cutting of feed pipe lengths, angular positioning of Tees, selecting and cutting of nipples and elbows or assembly thereof by skilled or experienced labor.

It is another object of this invention to provide a sprinkler system that can be accurately installed without need for skilled labor.

It is another object of this invention to provide a sprinkler system that is easy and quick to install, thereby cutting labor time and cost.

It is another object of this invention to provide a sprinkler system that permits use of the modern 12-24" pop-up plastic sprinkler heads without requiring digging 12-24" deep trenches.

It is another object of this invention to provide sprinkler heads and branch feed line assemblies in kit form.

It is another object of this invention to provide special non-kinking sprinkler head branch feed lines that can be sheathed for heavy duty use.

It is another object to provide a non-drifting sprinkler head which includes a special plate assembly that simplifies accurate head placement while the soil goes through its post-backfill compaction cycle.

Still other objects will be evident from the specification, claims, drawings and abstract.

DRAWINGS

SUMMARY

Figure 1:
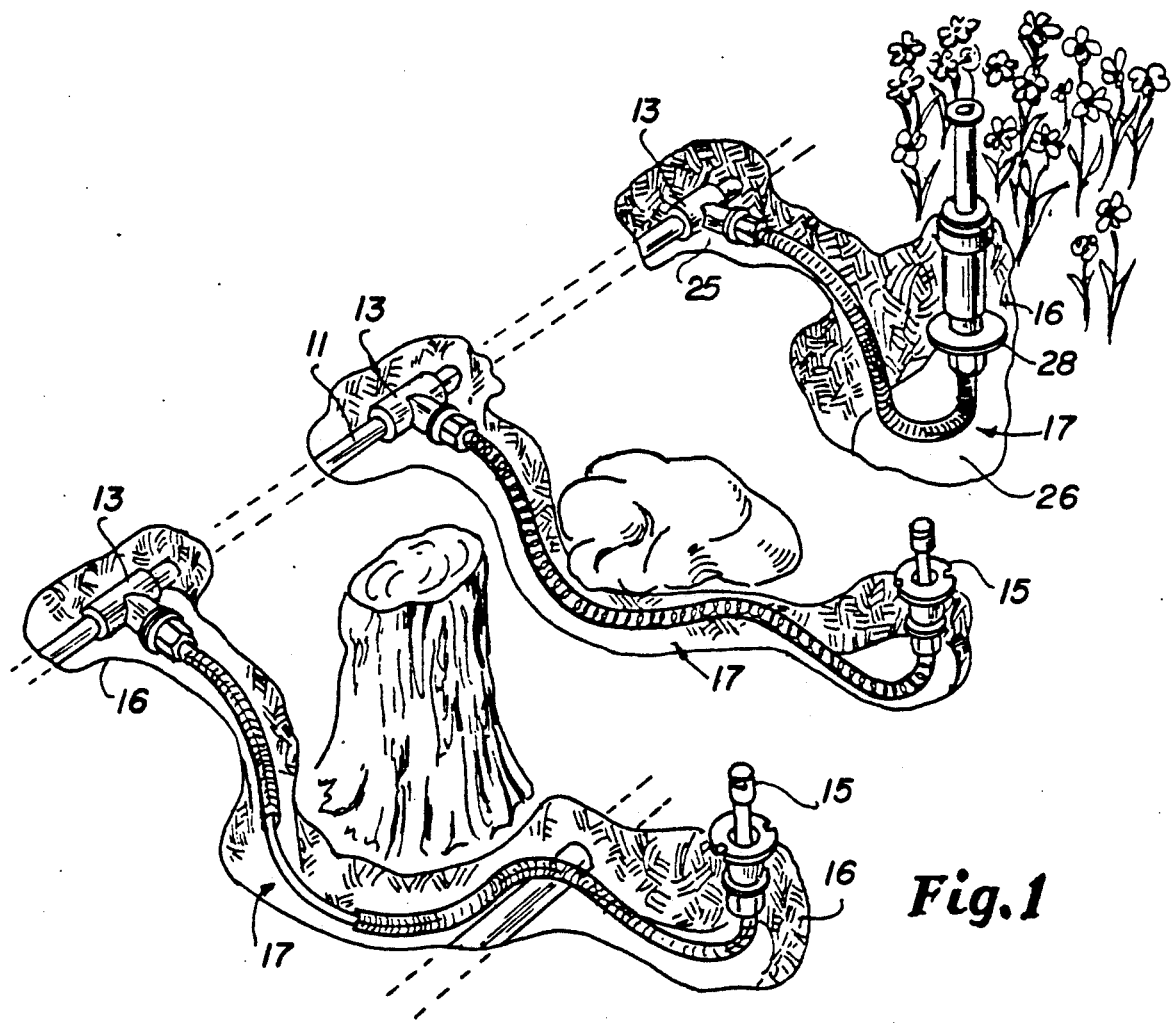
FIG. 1 shows in an elevated perspective several sprinkler heads in accord with this invention connected to a water feed pipe.

The branch connector assemblies of this invention include a specially constructed underground hose having a combination of a high degree of flexibility and kink resistance, and threaded terminals (connectors) at both ends for interconnection between a water supply line (feed line), typically a lateral line, and a variety of sprinkler head types. This construction allows great freedom in locating the sprinkler head relative to the water supply pipe as might otherwise be difficult or impossible due to unexpected encounters with natural obstacles such as rocks and roots, etc. It also permits use of unskilled labor for ditch digging so that precise layout of main, lateral and branch feed lines is not required. Being flexible, the hose may be bent or coiled to permit precise lateral and vertical spotting and adjustment of the sprinkler head location. In addition it permits digging only a 6" deep trench flanked by spaced 12-24" pits, in which the modern "pop-up" heads may be accurately located. Further, the special flexible, non-kink hose with terminal screw-on or slip-in connectors eliminates cutting and gluing of nipples, elbows, extensions and the like. It permits angular misalignment of side-branch Tees, and main and lateral line elbows, without causing sprinkler head misalignment or elevation errors.

An important element of the invention is providing a hose having means that prevents kinking. The hose is also more flexible, more resistant to bursting by excessive water pressure, and more resistant to being crushed by the surrounding earth or cut by spades than are the short, substantially rigid connections disclosed in the prior art. The preferred best mode is a flexible vinyl hose in which a steel coil is embedded. In another embodiment the vinyl hose is enclosed in a slip-on or slip-over pleated (corrugated) jacket. Alternately, the vinyl hose may employ reinforcing fiber glass or nylon cord for extra strength.

In the preferred best mode embodiment the end connector comprises a ferrule and a short tubular metal or plastic body that has a male thread on one end, and an interior connector shoulder adjacent to the other end. In order to attach the connector to the hose, the hose is inserted through the shoulder end of the connector tube and out through the threaded end so that the ferrule can then be pressed into the open end of the hose. This causes the end section of the hose to expand slightly so as to produce a bulge. The connector body is then pulled toward the ferrule end of the hose so that the internal shoulder comes into contact with the bulge end and thereby secures the threaded end connector to the hose. The threaded end of the connector may now be screwed into the inlet of the sprinkler head.

The other end of hose has an identical male connector (or optionally a female connector) that may be screwed into (or onto) a fitting such as a threaded Tee or Ell in the main water supply pipe.

The hose body length is provided in several lengths in order to accommodate a variety of "pop-up" sprinkler heads. When water is not flowing, the stems of the sprinkler head may be enclosed within the end connector body so that the top of the sprinkler head rests at ground level. When the head is in this position, the sprinkler head is protected from inadvertent blows such as being struck by a lawn mower. When the water is turned on, water pressure in the connector body forces the sprinkler head to pop up above ground so that water emitted therefrom can spread out over a wider ground area.

The outside surface of the end connector body is preferably hexagonal in order that it may be easily tightened to the sprinkler head or lateral line feed Tee or Ell with a wrench.

This construction of the end connector also permits another feature of the invention which is a plate having a hole, preferably threaded, in its center. The plate is screwed onto the connector body so that the threaded end protrudes through the hole in the plate. The inlet of the sprinkler head is then screwed onto the protruding end of the connector. When the sprinkler head is positioned in the ground, the plate, which is now a few inches below ground level and covered with dirt, supports the sprinkler in its upright position. The plate, which may be any shape, is preferably an apertured, planar round plate. The apertures permit soil to pass through during tamping and the compaction cycle, but the webbing between adjacent holes engage compacted soil to maintain the sprinkler head in place.

Another advantage of the connector assembly and plate construction of this invention over the prior art is that any one of the many sprinkler heads on the market may be attached since they all have a standard threaded female inlet.

Much of the labor cost in installing sprinklers according to current art resides in having to provide exact lengths of rigid pipe, supplies, transitions, Tees and Ells in order to locate the sprinkler head at some precise location relative to the water supply pipe. A major advantage of the ready-made and kit embodiments of this invention is that the position of the supply pipe need only be approximate because of the flexibility of the hose. Thus, inconveniences or inaccuracies in cutting rigid pipe of prior art construction are avoided.

A further advantage is that if the sprinkler head is subject to a blow from a passing machine or pedestrian, the head can yield by virtue of the flexibility of the hose so that pipe rupture is avoided. The presence of the plate facilitates positioning the sprinkler at the required elevation not only when the irrigation system is being constructed, but also facilitates relocation in the event the sprinkler head is disturbed or the ground settles or heaves.

DETAILED DESCRIPTION OF THE PREFERRED EMBODIMENT

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

The term "main" line means the water feed line from a source to a valve, which main line is continuously under pressure. Downstream of the valve is (are) the "lateral" line(s), off which branch the connector lines to the sprinkler heads The application of this invention is illustrated in FIG. 1. There is shown a lateral water supply pipe 11, with a number of tees 13 (three are shown), and the sprinkler heads 15, each connected to a tee by means of the flexible, non-kink branch connector assemblies 17 of this invention.

Figure 2:
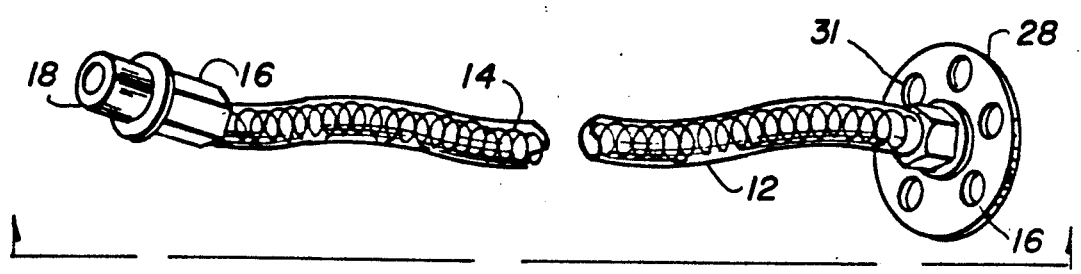
FIG. 2 shows a perspective assembly view of a single connector assembly of this invention.
Figure 3:
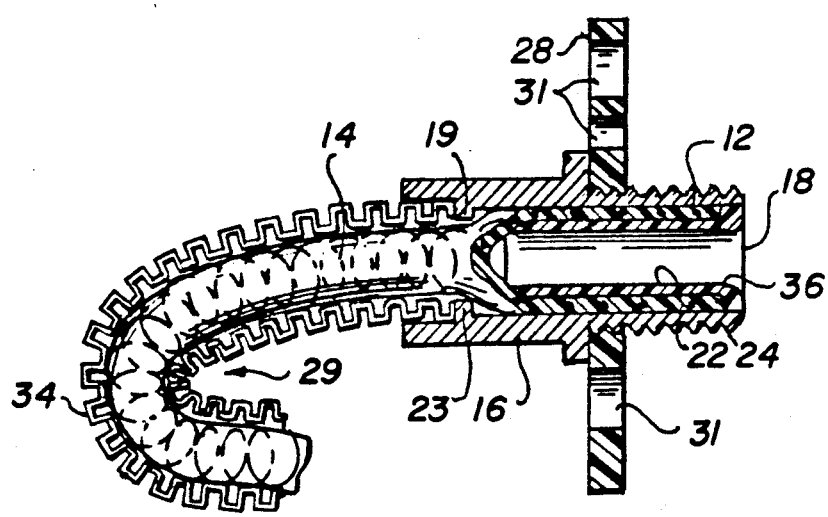
FIG. 3 shows a cross-section view of the connector assembly in which the hose member is covered by a corrugated sheath which protects the hose and prevents kinking when the hose is bent.
Figure 4:
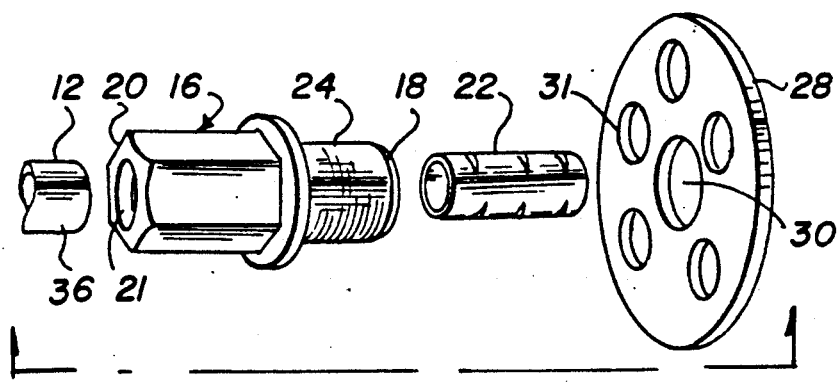
FIG. 4 is an exploded view of the end connector, plate and ferrule.

Each branch connector is shown in greater detail in the assembly view of FIG. 2, the cross-section view of FIG. 3 and the exploded view of FIG. 4. The hose 12 of this preferred embodiment is fabricated from elastomeric material, preferably a plastic such as vinyl, which is enclosed by, encloses, or preferably in which is embedded, a steel or plastic coil 14. The elastomeric material provides flexibility and shields the embedded coil from a corrosive environment. The coil 14 prevents collapse of the hose that might result from pressure of the surrounding earth and resists cutting by spade blows. The coil also prevents kinking so that the hose may be extended in any desired directions, circled around any obstacle, coiled, bent double, bent in an S-shape, etc.

The end terminal connector body 16 has an axial bore 21 that is large enough at one end 20 of the connector to allow insertion of the hose. The bore diameter is slightly enlarged at the other end 18 so as to form shoulder 19 medial of the end 20. A ferrule 22 preferably of brass or plastic, may be pressed into the opening 36 of hose 12 (FIG. 3) thereby expanding the end of the hose and securing it to the connector. The connector body has a male thread 24 on its delivery end so that it may be screwed into the female thread of a fitting such as a tee (see FIG. 1) or a street ell (not shown), forming a section of the water supply pipe (main or lateral), or into the inlet of a sprinkler head (FIGS. 1, 6. 7 and 8).

The hose is preferably precut to a standard length, such as 12", 18", 24", 36" or more. Preferably, another identical terminal connector is fastened to the other end of the hose and screwed into a female inlet such as the sprinkler head.

Referring to FIGS. 2, 3, 4, 6, and 7, a plate 28 having a central hole 30, preferably threaded, may be mounted onto the threaded end of the connector 16 so that the threaded section 24 protrudes through the hole 30. A sprinkler head is screwed onto the threaded end 24 (See FIGS. 6–8). Any one of a number of styles of sprinkler heads on the market may be employed. As best seen in FIGS. 2, and 4, the connector body 16 is shown having a hexagonal exterior shape adapted for use of a wrench for connection or removal from Tees, Ells or heads.

Figure 6:
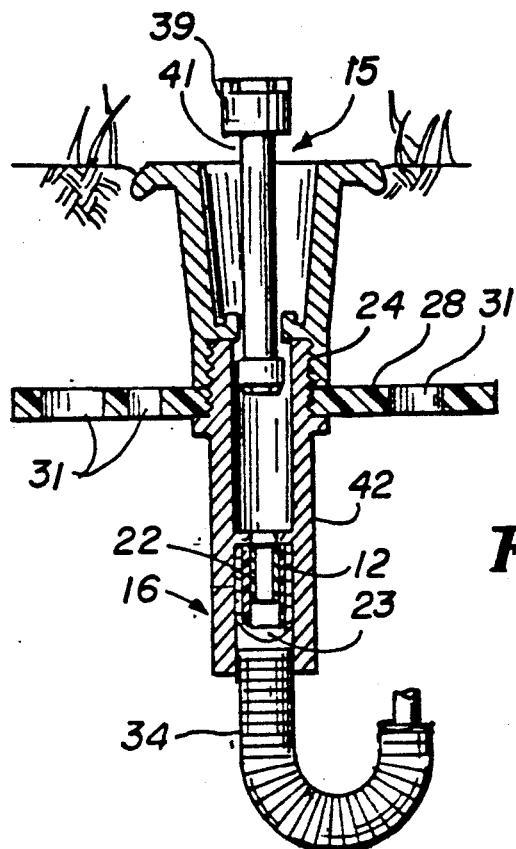
FIG. 6 is a cross-section view of a connector of this invention connected to a sprinkler head in its elevated position.

The sprinkler head is then set with the plate 28 a few inches below the ground surface (as shown in FIG. 6), and the dirt tamped under and over it. The plate fixes the sprinkler head firmly in the vertical position. Holes 31 in plate 30 permit ease of tamping dirt and permits settling compaction of dirt without voids forming under the plate. In cold weather areas the holes 31 permit earth freeze/thaw movement therethrough, without disturbing the sprinkler head position.

Figure 5:
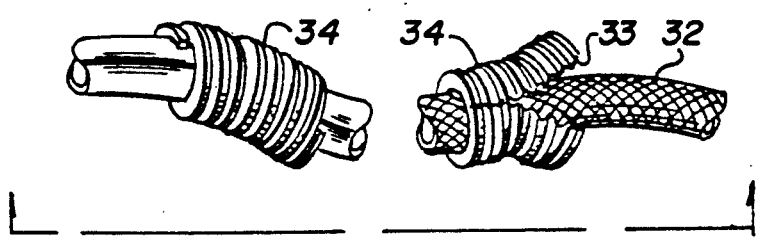
FIG. 5 shows in perspective a hose of FIG. 3 enclosed by a pleated cover.

An embodiment of the non-kink hose construction, shown in perspective in FIG. 5 and in section in FIG. 3, employs pleated vinyl jacket 34 enclosing the vinyl hose 12. As seen in FIG. 3, the pleats are generally U-shaped in cross section, rather than V-shaped. As seen in FIG. 3 in the bent section 29 of the hose, the bottom of the U has a longitudinal dimension such that when the hose is bent the pleated inner surfaces of the corrugated tube sheath contact adjacent pleats or corrugations and resist further bending, which otherwise would kink the tube.

Figure 7:
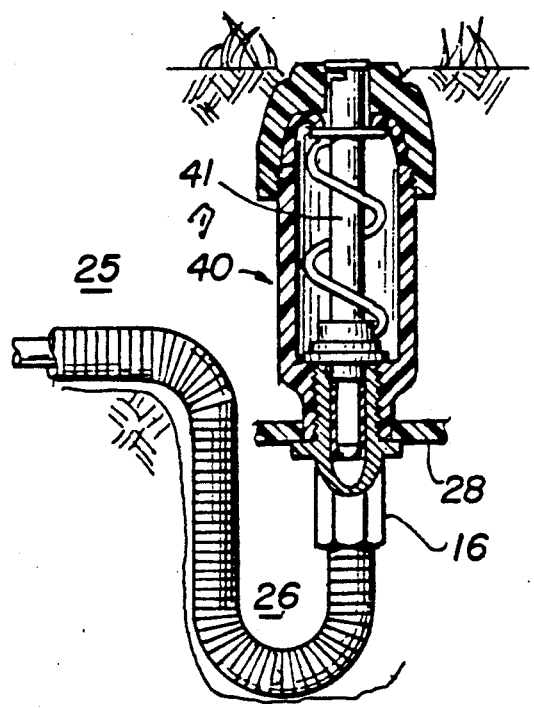
FIG. 7 shows a cross-section view of a connector of this invention connected to a "pop-up" sprinkler head in its retracted position.

As seen in FIGS. 1 and 6 through 8, in use the corrugated external sheath serves multiple functions, in that it is a protection against light deterioration, against abrasions and severing by spades, puncturing by rocks, etc. In addition, as best seen in FIGS. 3, 6 and 7 it limits the bending radius of the hose so that it will not kink. By use of this sheath, a cheaper clear vinyl hose (FIG. 5) can be used in this embodiment (employing the sheath), as compared to employing a hose with reinforcement, such as the wire or plastic coil or the fiberglass or plastic inner plies 32 (see FIG. 5, right end). A suitable corrugated sheathing that may be used is a commercially available split plastic sheathing used for electrical or hi-fi wire bundles. The sheathing may be split, as shown at 33 in FIG. 5, so it may be applied over the tube after the two end connectors are secured to the ends of the hose. Preferably it is not split, and is assembled in sequence by slipping over the hose after one of the end connectors is secured in place, or before either are attached to the hose. The ends of the sheathing are received in recess 23 at the inlet end of the end connectors 16. This is best shown in FIGS. 3 and 6.

In kit form, the hose with assembled connectors and a sprinkler head may be offered in a plastic bag. Optionally an appropriate connector Tee or Ell, the stabilizing plate 30, and a short female/female interconnector coupling (not shown) for joining two short hose assemblies into a single long assembly may be packaged in the kit. Multiple hoses, Tees, Ells, heads, interconnectors may be packaged as a kit. A lateral supply pipe is then cut to approximate length, the Tee or Ell is glued or threaded into place, and the hose with sprinkler head is then assembled before or after the trench is dug. It should be appreciated that the trenching now need only be approximate in location and depth.

In another embodiment of the kit, the end connectors, a ferrule and an extra-long piece of hose may be packaged. The hose is then cut to approximate length, the ends inserted into the receiving ends 20 of the end connectors 16, pulled on through the connectors, ferrules 22 inserted, and the end connectors then snugged tight against the ends of the hose. The sprinkler head is threaded onto the end connector and the opposite end to the supply pipe, Tee, Ell or interconnector.

It should be understood that the end connectors may be made of metal or plastic, and may be unthreaded if made of plastic. In the case of the unthreaded end connectors, they are sized to slip-fit into an unthreaded Tee or Ell and are glued in place with appropriate conventional solvent type glue. In addition, while the connector assemblies of this invention are typically provided with two male connectors, one on each end, where necessary one or more female connector end pieces may be provided as required.

The connector assemblies of this invention can be pre-assembled in a factory, and supplied ready-made "one size fits all" at the job site. The hose is provided with some excess length. The excess is then bent or coiled in the trench. This provides an additional benefit, in that if the sprinkling array needs to be adjusted, the homeowner or installer knows that there is additional hose already present in place that can be used. The heads can then be placed anywhere within a circular area $\pi R^2$, the radial distance of which is the length, R, of the hose provided. This feature makes the invention much more versatile than present systems offered in the art. Less expensive trenching equipment offering only a maximum trench depth on the order of 6-12 inches may be used to lay out the main supply line trenches. Where the long pop-up heads are required, say 12" to 24" pop-up heads to clear adjacent bushes to water lawns beyond, a posthole digger may be employed to provide the pit for the pop-up sprinkler head. The flexible hose can then be snaked down into the pit from the shallow trench and the installation proceeds rapidly.

By use of a pleated jacket fabricated from black opaque vinyl, the hose is provided with some protection from the sun's ultra-violet light where the hose might be exposed, for example crossing artificial landscaping streams, during extended installation periods, or the like.

Figure 8:
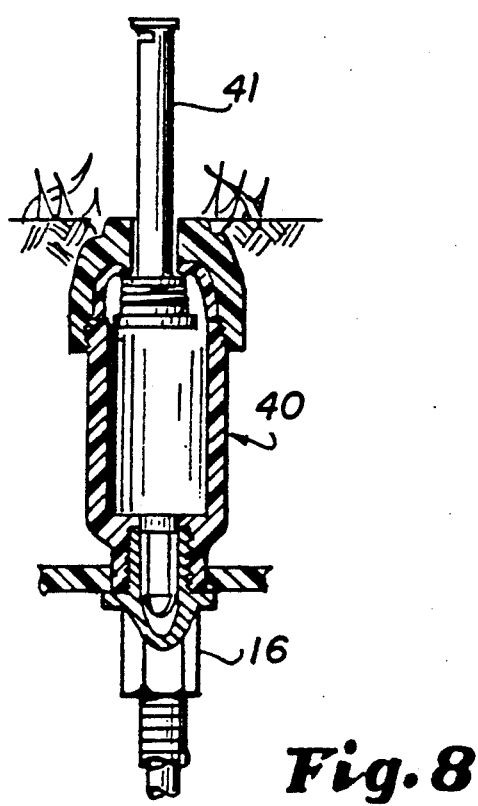
FIG. 8 shows a cross-section view of a connector of this invention connected in its extended ("pop-up") position.

FIG. 6 shows in cross-section a conventional mist-type sprinkler head 39 screwed onto a longer end connector body 16 of this invention. The stem 41 is retractable into the long body 42 of the end connector 16. FIG. 7 shows a longer "pop-up" type of sprinkler head 40 in the retracted condition where the head is even with the ground. In FIG. 8, the stem 41 is above ground due to water pressure. Note in FIG. 7 the hose snakes down from the shallow trench 25 into the deeper pop-up head pit 26.

The system of this invention provides an additional advantage. For example, backfilling is no longer critical as the heads are positionally adjusted after backfilling by moving them manually into position in the loose soil. Further, the heads are easily repositioned due to ground movement, or where plantings change size in time. Also, it becomes easy to change heads, eg. from the short mist type (non-spring loaded) heads of FIG. 6 to the long spring loaded canister type pop-ups of FIGS. 7 and 8, which change is difficult if not impossible in the rigid prior art branch connector system.

It should be understood that various modifications within the scope of this invention can be made by one of ordinary skill in the art without departing from the spirit thereof. For example, the tubing of underground connectors of this invention are typically on the order of 5/16" ID / ½" OD. In cases where main lines of lateral feed lines 11 (FIG. 1) encounter rocks, trees, walls or other underground obstructions, the obstruction can be bypassed by use of an underground connector of this invention employing a somewhat larger tubing, eg. ½", ¾" or larger ID tubing with proportionally larger slip or threaded end connector fittings. Thus, schedule 40 pipe can be used for the lateral feed lines downstream of the valve except where obstacles are encountered. These obstacles, the larger tubing underground connectors of this invention are used as by-passes, and thence back to schedule 40. The branch connectors remain the flexible, non-kink underground connectors of this invention. I therefore wish my invention to be defined by the scope of the appended claims as broadly as the prior art will permit, and in view of the specification if need be.

I claim:

1. An underground branch connector assembly for water feed which assembly extends from a supply pipe having a fitting for branch feed to a sprinkler head having a top water-emitting end and a bottom water-supply inlet end, which assembly comprises in operative combination:
    a) a highly flexible, hose, having a selected length R, a smooth, unobstructed, central bore, a first hose end, and a second hose end;
    b) said hose including means for reducing the tendency for kinking and permitting said hose to be bent into short radius curves while retaining bore smoothness and flexibility without kinking, said anti-kink means being disposed external of the bore of said hose;
    c) first means for connecting said first hose end to said supply pipe fitting;
    d) second means for connecting said second hose end to said sprinkler head water supply end; and
    e) said sprinkler head, by virtue of said anti-kink flexibility of said hose, is selectively positionable during or after installation at any location within the area $\pi R^2$ around the supply pipe fitting and at any angle or elevation relative thereto without loss of water supply due to kinking of the hose and without introduction of substantial water pressure loss at said sprinkler head as compared to use of multiple, angled pipe fittings.

2. An underground branch connector assembly as in claim 1 wherein:
   a) said hose is a plastic material.

3. An underground branch connector as in claim 2 wherein:
   a) said anti-kinking means comprises a resilient corrugated sleeve enclosing said hose; and
   b) said sleeve corrugations being adapted to limit the coiling diameter of said hose to prevent said hose from being bent so acutely as to form a water flow cut-off kink.

4. An underground branch connector assembly as in claim 3 wherein:
   a) said sleeve is a plastic material.

5. An underground branch connector assembly as in claim 2 wherein:
   a) said anti-kinking means comprises means for reinforcing said hose embedded in the wall of said hose.

6. An underground branch connector assembly as in claim 5 wherein:
   a) said reinforcing means is a coiled spring member.

7. An underground branch connector assembly as in claim 6 wherein:
   a) said spring member is a plastic or a steel material.

8. An underground branch connector assembly as in claim 5 wherein:
   a) said reinforcing means includes plies of fibrous material.

9. An underground branch connector assembly as in claim 1 wherein:
   a) said first and said second hose connector means are selected from male and female threaded members secured to said respective hose ends.

10. An underground branch connector assembly as in claim 9 wherein both of said hose connector means are male.

11. An underground branch connector assembly as in claim 10 wherein:
    a) said hose connector means are metal or plastic materials.

12. An underground branch connector assembly as in claim 9 wherein:
    a) said hose connector means includes a generally tubular body, the exterior surface of which is adapted with multiple flat surfaces engageable by a wrench.

13. An underground branch connector assembly as in claim 9 wherein each of said hose connector means includes:
    a) a generally tubular body having an outer surface having threads disposed on said outer surface adjacent a first end, and an inner surface having a shoulder adjacent a second end;
    b) said inner surface engaging one of said hose ends so that said hose extends out of said second end; and
    c) a ferrule pressed into said engaged hose end thereby securing said hose end in engagement with said shoulder in said tubular body so that said threaded end may be screwed into said main feed fitting or said sprinkler head as described.

14. An underground branch connector assembly as in claim 12 wherein:
    a) said hose connector tubular body has a length sufficient to receive an internal stem of a "pop-up" sprinkler head in a retracted position when no water flows through said sprinkler head.

15. An underground branch connector assembly as in claim 1 which includes:
    a) a plate having at least one hole therethrough for receivably engaging one of said hose end connectors; and
    b) a said plate being disposed medial of said top end of said sprinkler permitting said plate to be buried so as to support said sprinkler in a predetermined position.

16. An underground branch connector as in claim 15 wherein:
    a) said plate has at least one additional hole therein to permit tamping and settling of soil therethrough into engagement with said plate.

17. A method for constructing a sprinkling system which comprises in any appropriate sequence the steps of:
    a) digging at least one trench in a convenient location to extend from a supply fitting of an underground water supply line to a desired general location for a sprinkler head;
    b) attaching to said supply fitting a first end of an underground branch connector assembly comprising:
       i) a highly flexible hose having a selected length R, which hose has a first hose end, a second hose end and a smooth, unobstructed central bore;
       ii) said hose including means for reducing the tendency for kinking and permitting said hose to be bent into short radius curves while retaining said bore smoothness and flexibility without kinking, and said anti-kink means being disposed external of the bore of said hose;
       iii) first means for connecting said first hose end to said main supply pipe fitting;
       iv) second means for connecting said second hose end to said sprinkler head;
       v) said sprinkler head, by virtue of said anti-kink flexibility of said hose, is selectively positionable during or after installation at any location within the area $\pi R^2$ around the water supply pipe fitting and at any angle or elevation relative thereto without loss of water supply due to kinking of the hose and without introduction of substantial water pressure loss at said sprinkler head as compared to use of multiple, angled pipe fittings;
    c) attaching said second connector means of said underground branch connector assembly to a sprinkler head; and
    d) burying said flexible connector in said trench with said sprinkler head positioned at a desired elevation and angle with respect to ground level and at a desired location within said area.

18. Method as in claim 17 which includes:
    a) digging at least one trench for a supply line; and
    b) digging branch trenches from said supply line to locations for sprinklers;
    c) attaching a plurality of said underground branch connector assemblies to said supply line;
    d) positioning said sprinkler heads in trenches or pits in a desired array; and
    e) burying said underground branch connector assemblies.

19. Method as in claim 17 wherein:

a) said underground branch connector assembly includes;
  i) a plate having at least one hole therethrough for receivably engaging one of said hose end connectors; and
  ii) said plate being disposed medial to said top end of said sprinkler permitting said plate to be buried so as to support said sprinkler in a predetermined position.

20. Method as in claim 18 wherein:
a) said supply and branch trenches are dug to a first depth; and
b) said trench area adjacent said sprinkler head location is dug to a depth different than the branch trench in relating to the length of the "pop-up" head used.

21. Method as in claim 18 which includes:
a) providing to at least portions of said supply line an underground connector of construction equivalent to said branch connector and having a tubing of enlarged inner diameter to bypass supply line underground obstructions.

22. A sprinkler system kit comprising:
a) An underground branch connector assembly for water feed which assembly extends from a supply pipe having a fitting for branch feed to a sprinkler head having a top water-emitting end and a bottom water-supply inlet end which kit comprises:
  i) a highly flexible hose having a selected length R which hose has a first hose end, a second hose end and a smooth, unobstructed central bore;
  ii) said hose including means for reducing the tendency for kinking and permitting said hose to be bent into short radius curves while retaining said bore smoothness and flexibility without kinking, said anti-kink means being disposed external of said hose bore;
  iii) first means for connecting said first hose end to said water supply pipe fitting;
  iv) second means for connecting said second hose end to said sprinkler head;
  v) said sprinkler head, by virtue of said anti-kink flexibility of said hose, is selectively positionable at any location within the area $\pi R^2$ around the water supply pipe fitting and at any angle or elevation relative thereto without loss of water supply due to kinking of the hose and without introduction of substantial water pressure loss at said sprinkler head as compared to use of multiple, angled pipe fittings; and
b) a sprinkler head having means for engaging at least one of said hose end connector means.

23. A sprinkling system kit as in claim 22 wherein:
a) said hose if precut to a predetermined length of less than about 6' and said hose end connector means are mounted on said hose ends.

24. A sprinkling system kit as in claim 23 which includes:
a) at least one fitting comprising an Ell or a Tee adapted to engage said supply pipe.

25. A sprinkling system kit as in claim 24 which includes:
a) a plurality of said underground branch connector assemblies.

26. A sprinkling system kit as in claim 25 which includes:
a) an interconnection fitting for connecting two of said underground branch connectors together.

27. A sprinkling system kit as in claim 25 which includes:
a) at least one length of supply line.

28. A sprinkling system kit as in claim 23 which includes:
a) a plate having at least one hole therethrough for receivably engaging one of said hose end connectors;
b) said plate being disposed medial of a top end of said sprinkler permitting said plate to be buried so as to support said sprinkler in a predetermined position.

29. A sprinkling system kit as in claim 28 wherein:
a) a said plate has at least one additional hole thereon to permit tamping and settling of soil therethrough into engagement with said plate.

30. A sprinkling system kit as in claim 23 wherein:
a) said hose is a plastic material in which a coiled spring reinforcing member selected from a plastic and a steel material is embedded; and
b) said hose connector means are male threaded members which include a generally tubular body, the exterior surface of which is adapted with multiple flat surfaces engageable by a wrench.

31. An underground connector assembly for water feed between two portions of a main or lateral supply pipe which two portions are interrupted by an underground obstruction which comprises in operative combination:
a) a highly flexible hose having a first hose end, a second hose end and a smooth, unobstructed central bore;
b) said hose including means for reducing the tendency for kinking and permitting said bore to be bent into short radius curves while retaining bore smoothness and flexibility without kinking, said anti-kink means being disposed external of the bore of said hose;
c) first means for connecting said first hose end to said first portion of said lateral or main supply pipe fitting;
d) second means for connecting said second hose end to a second main or lateral supply pipe portion; and
e) said underground obstruction, by virtue of said anti-kink flexibility of said hose, being selectively bypassable without loss of water supply due to kinking of the hose between said first and second pipe portions and without introduction of substantial water pressure loss at said sprinkler head as compared to use of multiple angled pipe fittings.

* * * * *